United States Patent [19]
Alves et al.

[11] 3,993,965
[45] Nov. 23, 1976

[54] LASER HAVING IMPROVED WINDOWS

[75] Inventors: Ronald V. Alves, Saratoga; Verne R. Costich, Mountain View, both of Calif.

[73] Assignee: Coherent Radiation, Palo Alto, Calif.

[22] Filed: Feb. 24, 1975

[21] Appl. No.: 552,371

[52] U.S. Cl. .......................................... 331/94.5 T
[51] Int. Cl.² .......................................... H01S 3/02
[58] Field of Search .......... 331/94.5; 350/160, 157; 330/4.3

[56] References Cited
UNITED STATES PATENTS
3,694,768   9/1972   Young et al. ................. 331/94.5 C Primary Examiner—William L. Sikes
Attorney, Agent, or Firm—Limbach, Limbach & Sutton

[57] ABSTRACT

A discharge tube for a gaseous laser is terminated with windows made of crystalline quartz which do not fluoresce in the presence of high energy, visible and ultraviolet light radiation.

36 Claims, 2 Drawing Figures

LASER HAVING IMPROVED WINDOWS

BACKGROUND OF THE INVENTION

The present invention relates to lasers and, in particular, to windows for lasers having improved transmission qualities.

A typical gas laser, such as an ion or krypton ion laser has a discharge tube or envelope enclosing the gaseous laser medium. A discharge is established through the lasing medium to excite the lasing medium to elevated energy states required for lasing action. An optical resonator or cavity is aligned with the discharge tube so that light emitted by the excited lasing medium oscillates between the optical resonator mirrors and is amplified as it passes through the lasing medium itself.

The ends of the discharge tube typically are terminated by highly light transmissive windows. The discharge tube is situated so that light oscillating between the resonator mirrors passes through these windows. In order to maximize transmission efficiency, frequently these windows are at Brewster's angle to the optical path. Since lasers tend to be relatively inefficient, they often are just above the threshold of operability. It is therefore very important that the optical losses in the cavity be kept to a minimum.

As a result of this requirement, the Brewster windows terminating the discharge tube, as well as other optical members whih may be inserted within the path of the optical cavity, are invariably made of fused silica, a form of vitreous silica. Fused silica is used for high quality optical applications because (1) it has very low optical losses, (2) it has a low thermal coefficient of expansion, and (3) it can be polished to a high quality finish.

Fused silica for high quality optical applications typically is made synthetically by vapor-phase hydrolysis. Oxygen is passed through a volatile silicon compound, such as silicon-tetrachloride and the resulting mixture is fed along with natural gas into a burner. Hydrogen is often used rather than natural gas. Hydrolysis takes place in the resulting flame, producing fused silica.

Fused silica should be distinguished from fused quartz, another vitreous silica, which is of lesser optical quality and is generally not used in applications such as lasers. Fused quartz is the material formed by direct melting of natural quartz crystals. For additional information about the properties of fused silica as well as other vitreous silica, such as fused quartz, reference is made to the *Encyclopedia of Chemical Technology*, Vol. 18, 2nd ed., John Wiley & Sons, Inc. 1969, pp. 73–105.

A perplexing problem which reduces laser efficiency is the phenomenon of a pink or reddish fluorescent light emission emanating from the Brewster windows terminating the laser discharge tube. This frequently observed phenomenon is observed in the section of the Brewster window through which the laser beam, oscillating between the resonator mirrors, passes. The fluorescence occurs from within the interior of the window and should be distinguished from the occasional surface fluorescent effects resulting from the deposition of miscellaneous materials on the surface of the window. The reasons for this fluorescence are not entirely understood but it is believed that it is a result of the bombardment of high energy visible and ultraviolet photons which are generated in the discharge tube plasma.

The amount of fluorescence can vary from window to window. It has also been observed that the amount of fluorescence usually increases with the usage of the laser. The presence of the red fluorescence is extremely detrimental to the laser performance. In effect, the energy which is used creating the fluorescent effect is energy which is taken out of the oscillating laser beam. Given the generally low efficiency of lasers, this means that the overall output energy can be seriously reduced by the fluorescent effect, or lasing action can be terminated altogether.

The problem is even more acute for wavelengths or lines having a lower intrinsic strength in the first place. This can be best explained by means of an example. The argon ion laser most frequently operates at 4880 A (blue) and 5145 A (green). However, an argon ion laser does have ultraviolet lines at 3638 A and 3511 A. Similarly, while krypton's most powerful wavelength is 6471 A (red), it has ultraviolet lines at 3507 A and 3564 A. As a general approximation, the visible lines of each of these two lasers are an order of magnitude greater in strength than the ultraviolet lines. As a result, if one operates or desires to operate an argon or krypton ion laser in the ultraviolet, one encounters a more serious deterioration, proportionately, in the output as a result of the fluorescence of the windows.

Another deleterious effect also occurs. It has been observed that the laser beam sometimes attempts to seek a lower loss path "around" the fluoresence. This causes a vibratory or dancing motion of the laser beam which can have the effect of altering the mode of the laser or, in some extreme situations, causing a total breakup of the beam itself.

Several approaches have been taken to solve this internal fluorescence problem. A common approach is simply to use fused silica windows which empirically have the lowest amount of fluorescence and then replace them after extended usage, since usage normally results in increasing fluorescence. Another approach has been to reduce the thickness of the windows which has the effect of reducing the overall intensity of the fluorescence. The former has the disadvantage that it is necessary to expend extensive amounts of time and labor to rebuild the laser and the latter has the problem that the thin windows can be distorted easily by mechanical strains thereby introducing optical inhomogeneities to the optical path. All of these approaches still assume that high quality glass must be used. Since these requirements are best met using fused silica, this has been the window material selected.

SUMMARY OF THE INVENTION

It is therefore an object of the invention to provide an improved laser having greater operating efficiencies.

Another object of the invention is to provide windows for a laser discharge tube which are not subject to fluorescence in the presence of high intensity optical and ultraviolet radiation.

Still another object of the invention is to provide improved Brewster windows for a laser.

Another object of the invention is to provide improved windows for inserting within the optical cavity of a laser.

In accordance with the present invention, crystalline quartz is used for optical windows within the optical cavity of a laser. It has been found that low-impurity, crystalline quartz, and in particular synthetically grown crystalline quartz, unlike fused silica, does not exhibit the undesirable pink or red internal fluorescence discussed previously. Brewster windows made of crystalline quartz are particularly desirable for gaseous lasers operating in the ultraviolet. Increased performance also results in the visible wavelengths as well.

Crystalline quartz differs from vitreous or fused silica in that the silica molecules are arranged in crystal lattices. While natural crystal quartz exists abundantly, higher optical quality crystalline quartz is grown synthetically by, for example, crystallization from alkaline solutions contained in steel pressure vessels at temperatures from 200° C to 500° C and pressures up to 25,000 psi.

Crystalline quartz whether synthetic or natural is generally not regarded as a desirable material where high quality optical properties are required, such as in a laser. Crystalline quartz has greater impurities, is less transmissive, has higher scatter, and can't be polished as well, as high quality fused silica.

Another characteristic of crystalline quartz, not existing in fused silica, is that it is birefringent. Birefringence is the splitting which a wave front experiences when a wave disturbance is propagated in an anisotropic material. In such materials, for each such propagation direction with linearly polarized electromagnetic waves, there are two principle displacement directions for which the velocity is different. These polarization directions are at right angles. When the plane of polarization of a light beam does not coincide with one of the two principle displacement directions, the light will be split into components parallel to each other. Generally, birefingence is not a desirable property in high quality optical applications.

In fact, the most frequent optical use of crystalline quartz is to take advantage of its birefringent properties. For example, see U.S. Pat. No. 3,868,592, issued to the assignee of the present patent application, entitled "Tuning Apparatus for a Dye Laser". However, in an application such as a Brewster window for a laser discharge tube, this birefringent property is not a desired one since it can result in unwanted polarization and so-called "optical activity".

Despite these disadvantages of crystalline quartz, and despite the fact that crystalline quartz was such an unlikely material for an application such as a Brewster window, the advantage obtained in the elimination of the pink fluorescence emission more than makes up for its disadvantages as an optical material.

In actual lasers utilizing this invention, the crystalline quartz was synthetically grown and known to have low concentrations of sodium, lithium and hydrogen impurities. The reason why this material does not exhibit the undesirable pink fluorescence is not fully understood. It is possible that it is the existence of these impurities or unknown imperfections in the crystalline structure which is responsible. By "imperfections" it is meant either impurities in the quartz or else "vacancies", where a vacancy is the absence of a silicon or oxygen atom in the crystalline structure. Or it may be the result of the crystalline structure itself, or something inherent in the process of growing the synthetic crystals which is responsible.

Another possible theory is that imperfection-causing line absorption is less in a crystalline material than in a fused material. By this it is meant that light energy absorption bands are much narrower and well-defined in crystalline quartz than with fused silica. As long as these absorption bands are outside of the laser wavelengths, no fluorescent activity takes place. Accordingly, the most desirable crystalline quartz material is one having (1) a low concentration and number of imperfections, and (2) imperfections having major absorption bands outside the laser region. These criteria are most easily met with synthetically grown crystalline quartz where, to a great extent, the type and concentration of impurities can be controlled.

It is to be understood that these are only theories and may not in fact explain the actual operation of this invention. Thus, it is not intended that the protection offered by this patent be tied to these theories or any other theories.

DESCRIPTION OF THE PREFERRED EMBODIMENTS

Figure 1:
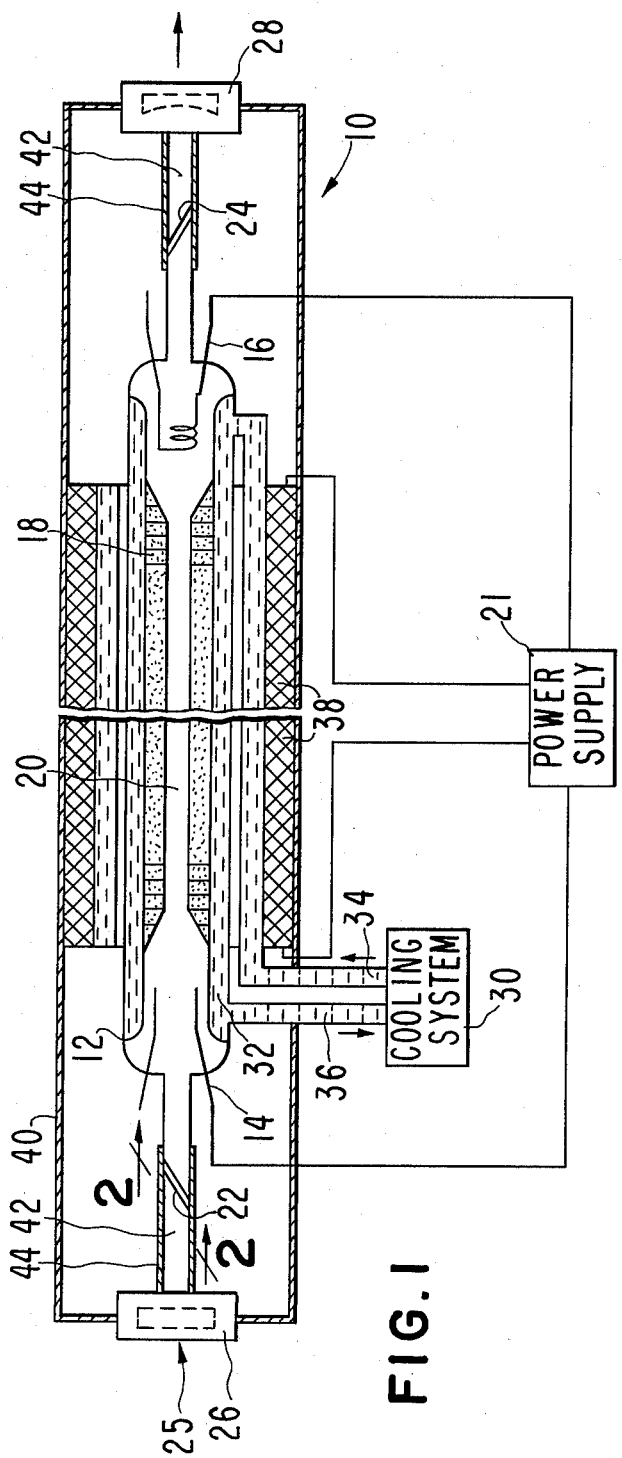
FIG. 1 is a cross-section view of a gaseous laser employing the present invention.

Illustrated schematically in FIG. 1 is a laser 10. For purposes of describing the invention, the laser depicted is a gaseous ion laser. Thus, it includes a high current gas discharge tube or envelope 12 including an anode 14, cathode 16, and a bore structure 18, located centrally thereof and defining an arc discharge path 20 as shown. The arc discharge is established by applying a voltage from a power supply 21 across the anode 14 and cathode 16. The discharge tube 12 is sealed and contains a gas such as argon or krypton or other suitable gas. The gas is the active lasing medium.

The anode and cathode are concentric and permit an optical beam created within the discharge tube to pass through windows 22 and 24 arranged at Brewster's angle to the path of the internally reflected coherent light beam to maximize light transmission efficiency therethrough. The Brewster windows terminate the gas discharge tube to form an air-tight seal formed, for example, with epoxy in the well-known manner.

The arc discharge causes the gases within the discharge tube 12 to be ionized and excited to energy levels and as these ions decay to lower energy states, radiation is emitted in a manner well-known to those skilled in the art. By providing an optical resonator structure 25 which includes a first mirror 26 which is substantially totally reflecting and a second mirror 28 which is approximately 97-98% reflecting, the resulting radiation is amplified and an output is provided through the mirror 28. For a more detailed description of an optical resonator structure, reference is made to U.S. Pat. No. 3,783,407 entitled "Improved Laser Optical Resonator".

Since the operation of the laser is at very high temperatures, in the vicinity of 1,000° C, a cooling system 30 is provided which includes a cooling jacket 32 surrounding the discharge tube. Water enters through one tube 34 into the cooling jacket 32 and returns to the cooling system through tube 36. A solenoidal electromagnet 38 surrounds the discharge tube 12 and provides an axial magnetic field. The function of the field is to increase the power output by confining and thereby increasing the ion density without lowering the electron energy enough to degrade the laser excitation. The magnetic field also decreases the formative time lag in arc initiation by the same mechanism. The solenoid 38 is energized from the power supply.

The entire laser assembly, including the resonator structure 25 and the discharge structure 18, is enclosed by a jacket or cover 40.

Each of the regions between the Brewster windows 22 and 24 and the mirrors 26 and 28 respectively of the optical resonator structure 25 define a space 42. Contamination or dust shields 44 enclose and connect the Brewster windows 22 and 24 with the mirrors 26 and 28 of the optical resonator structure.

Figure 2:
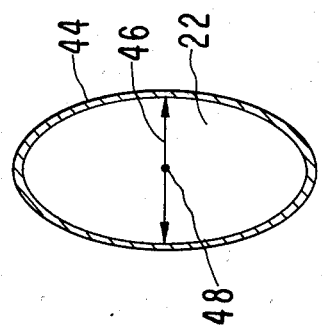
FIG. 2 is a view of one of the Brewster windows of FIG. 1, in the direction indicated by the arrows.

In accordance with the present invention, the Brewster windows 22 and 24 are made of a synthetically-grown crystalline quartz having low impurity concentrations. The windows are oriented in a way to eliminate the birefringent effect of the crystalline quartz. One example of how this can be accomplished is illustrated in FIG. 2, a plane view of one of the Brewster windows 22. The Brewster window has an elliptical surface. The Brewster window 22 is cut during its fabrication so that the optical axis 46 of the crystalline window also defines the minor axis of the ellipse.

This axis is then oriented so that it is perpendicular to the optical axis 48 of the laser which is indicated by the dot in FIG. 2. In this manner, the birefringent and optical activity which could result from the crystalline quartz is eliminated.

In one actual embodiment, the Brewster window 22 has a minor axis dimension of 9 mm., a major axis dimension of 16.7 mm., and a thickness of 1.5 mm. The window materials were purchased from Sawyer Research Products of Eastlake, Ohio, designated "Optical Quality Cultured Quartz." Processes for growing crystalline quartz are well-known in the art. For examples of patent literature relating to quartz crystal growing, reference is made to U.S. Pat. Nos. 2,537,043; 2,674,520; 2,785,058; 2,895,812; and 2,923,605.

This quartz material has three known impurities, lithium, sodium and hydrogen, in amounts ranging from ½ to 1 part per million of lithium, 2 to 9 parts per million of sodium and 5 to 20 parts per million of hydrogen. Lasers using this crystalline quartz material as windows have operated for several hundred hours with no evidence of pink fluorescence.

Crystalline quartz as a non-fluorescing, transmissive window has use in any application where such a window is required with a laser, particularly in lasers operating in the ultraviolet or near-ultraviolet part of the spectrum. Thus, while the invention has been described for purposes of illustration in an ion laser, it has equal applicability in other types of lasers. For example, metal-vapor lasers, such as helium-cadmium lasers, are a class of lasers which would be particularly applicable for use with the present invention.

While the invention has been described in terms of the use of this material in a Brewster window terminating a discharge tube in a gaseous laser, the invention should not be so limited. Thus, for example, some gas laser discharge tubes are terminated with windows which are perpendicular to the optical path of the laser. Crystalline quartz has equal applicability as the window material in this situation.

What is claimed is:

1. A laser comprising:
   a. a gaseous lasing medium;
   b. a discharge tube for enclosing said gaseous lasing medium;
   c. means for exciting said gaseous lasing medium;
   d. an optical resonator structure aligned with said discharge tube; and
   e. a pair of Brewster angle windows terminating the ends of said discharge tube, said windows comprising crystalline quartz.

2. A laser as in claim 1 wherein said crystalline quartz is synthetically grown.

3. A laser as in claim 2 wherein said synthetically grown quartz includes low concentrations of impurities taken from the group comprising lithium, sodium and hydrogen.

4. In a laser having a laser medium, an optical resonator therewith, and means for exciting the laser medium, and having windows within the optical resonator cavity through which the laser beam passes and wherein the improvement comprises said windows comprising crystalline quartz.

5. A laser as in claim 4 wherein said crystalline quartz has low numbers and concentrations of imperfections.

6. A laser as in claim 5 wherein said crystalline quartz is synthetically grown.

7. A laser as in claim 6 wherein said crystalline quartz includes the impurity sodium.

8. A laser as in claim 7 wherein the sodium comprises approximately 2 to 9 parts per million.

9. A laser as in claim 6 wherein said crystalline quartz includes the impurity lithium.

10. A laser as in claim 9 wherein the lithium comprises approximately ½ to 1 parts per million.

11. A laser as in claim 6 wherein said crystalline quartz includes the impurity hydrogen.

12. A laser as in claim 11 wherein the hydrogen comprises approximately 5 to 20 parts per million.

13. A laser as in claim 6 wherein said crystalline quartz includes the impurities lithium, sodium and hydrogen.

14. A laser as in claim 13 wherein the lithium comprises approximately ½ to 1 parts per million, the sodium comprises approximately 2 to 9 parts per million, and the hydrogen comprises approximately 5 to 20 parts per million.

15. A laser as in claim 5 wherein said crystalline quartz includes the impurity sodium.

16. A laser as in claim 15 wherein the sodium comprises approximately 2 to 9 parts per million.

17. A laser as in claim 5 wherein said crystalline quartz includes the impurity lithium.

18. A laser as in claim 17 wherein the lithium comprises approximately ½ to 1 parts per million.

19. A laser as in claim 5 wherein said crystalline quartz includes the impurities lithium, sodium and hydrogen.

20. A laser as in claim 19 wherein the lithium comprises approximately ½ to 1 parts per million, the sodium comprises approximately 2 to 9 parts per million, and the hydrogen comprises approximately 5 to 20 parts per million.

21. A laser comprising:
   a. a gaseous lasing medium;
   b. a discharge tube for enclosing said gaseous lasing medium;
   c. means for exciting said gaseous lasing medium;
   d. an optical resonator structure aligned with said discharge tube; and
   e. a pair of Brewster angle windows terminating the ends of said discharge tube, said windows comprising quartz having an impurity taken from the group comprising lithium, sodium and hydrogen.

22. A laser as in claim 21 wherein said impurity is lithium.

23. A laser as in claim 22 wherein said lithium comprises approximately ½ to 1 parts per million.

24. A laser as in claim 21 wherein said impurity is sodium.

25. A laser as in claim 24 wherein said sodium comprises approximately 2 to 9 parts per million.

26. A laser as in claim 21 wherein said impurity comprises lithium, sodium and hydrogen.

27. A laser as in claim 26 wherein said lithium comprises approximately ½ to 1 part per million, said sodium comprises approximately 2 to 9 parts per million, and said hydrogen comprises approximately 5 to 20 parts per million.

28. A method of preventing red fluorescence caused by the passage of high power visible and ultraviolet light through a light transmissive member in a laser resonator cavity comprising the step of inserting only light transmissive members comprising crystalline quartz within the resonator cavity.

29. A method of preventing red fluorescence caused by the passage of high power visible and ultraviolet light through a light transmissive member in a laser resonator cavity comprising the steps of inserting within the cavity only light transmissive members comprising synthetically-grown crystalline quartz having low numbers and concentrations of imperfections and orienting said crystalline quartz to eliminate birefringence.

30. The method as in claim 29 wherein the imperfections comprise impurities taken from the group comprising lithium, sodium and hydrogen.

31. A method of preventing red fluorescence caused by the passage of high power visible and ultraviolet light through a light transmissive member in a laser comprising the step of inserting only light transmissive members comprising quartz doped with one, two or all impurities taken from the group comprising lithium, sodium, and hydrogen.

32. A method of preventing red fluorescence caused by the passage of high power visible and ultraviolet light through a light transmissive member in a laser comprising the step of inserting only light transmissive members comprising crystalline quartz doped with one, two or all impurities taken from the group comprising lithium, sodium and hydrogen.

33. A method of preventing red fluorescence caused by the passage of high power visible and ultraviolet light through a light transmissive member comprising the step of inserting within the path of a linearly polarized laser beam a crystalline quartz, light transmissive member oriented with the optical axis of said crystalline quartz normal to the axis of polarization of such laser beam to eliminate the intrinsic birefringence of said crystalline quartz.

34. A member as in claim 33 wherein said crystalline quartz is synthetically grown with low numbers and levels of imperfections.

35. A member as in claim 34 wherein said quartz includes one, two or all impurities taken from the group comprising lithium, sodium and hydrogen.

36. A member as in claim 33 wherein said quartz includes one, two or all impurities taken from the group comprising lithium and sodium.

* * * * *